(No Model.) 3 Sheets—Sheet 1.
C. CUMMINGS.
MEANS FOR DIMINISHING THE CONSUMPTION OF BATTERY IN NORMALLY CLOSED CIRCUITS.
No. 306,225. Patented Oct. 7, 1884.
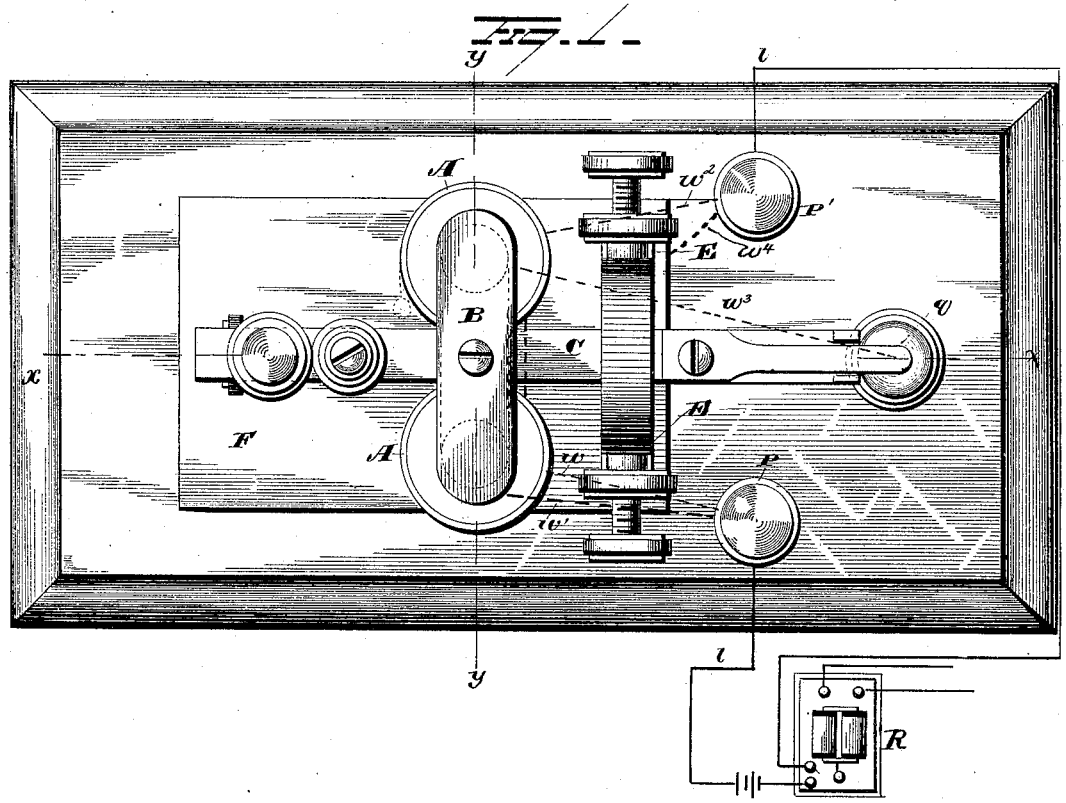
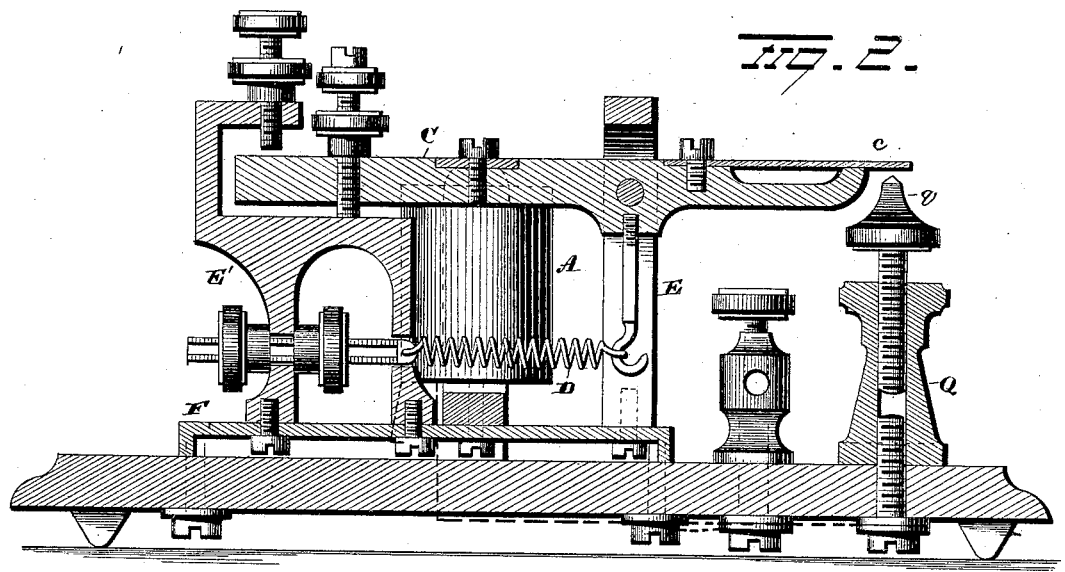
WITNESSES
INVENTOR
Charles Cummings
ATTORNEY (No Model.) 3 Sheets—Sheet 2.
C. CUMMINGS.
MEANS FOR DIMINISHING THE CONSUMPTION OF BATTERY IN NORMALLY CLOSED CIRCUITS.
No. 306,225. Patented Oct. 7, 1884.
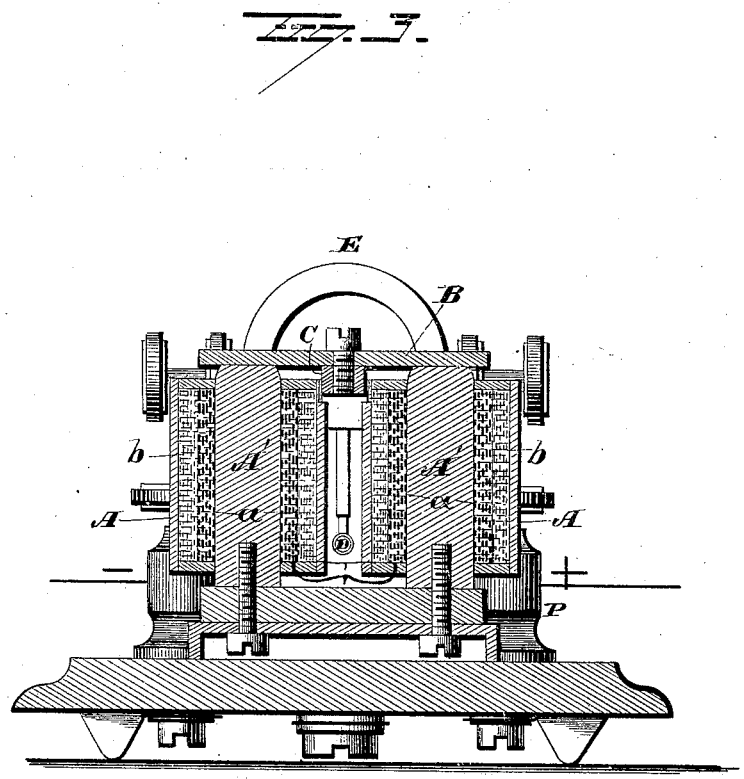
WITNESSES
INVENTOR
ATTORNEY (No Model.) 3 Sheets—Sheet 3.
C. CUMMINGS.
MEANS FOR DIMINISHING THE CONSUMPTION OF BATTERY IN NORMALLY CLOSED CIRCUITS.
No. 306,225. Patented Oct. 7, 1884.
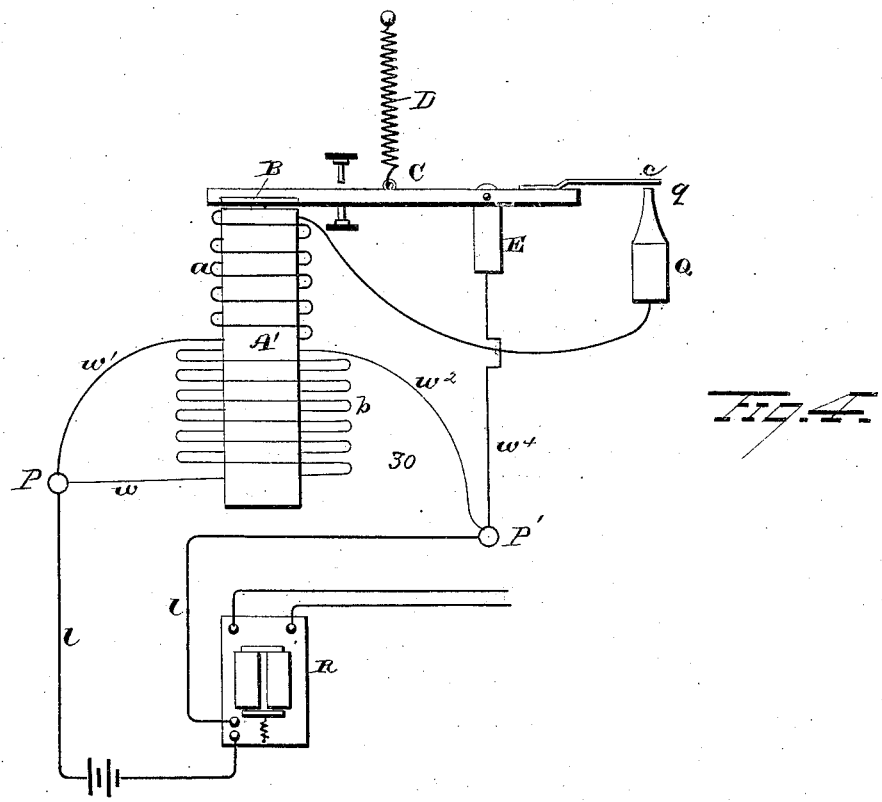
WITNESSES
INVENTOR
Chas. Cummings
ATTORNEY

UNITED STATES PATENT OFFICE.

CHARLES CUMMINGS, OF RENO, NEVADA, ASSIGNOR OF SEVEN-TWELFTHS TO ANDREW FRASER, OF SAME PLACE.

MEANS FOR DIMINISHING THE CONSUMPTION OF BATTERY IN NORMALLY-CLOSED CIRCUITS.

SPECIFICATION forming part of Letters Patent No. 306,225, dated October 7, 1884.

Application filed April 14, 1884. (No model.)

*To all whom it may concern:*

Be it known that I, CHARLES CUMMINGS, of Reno, in the county of Washoe and State of Nevada, have invented certain new and useful Improvements in Electro-Magnetic Apparatus; and I do hereby declare the following to be a full, clear, and exact description of the invention, such as will enable others skilled in the art to which it appertains to make and use the same.

My invention relates to an improvement in electro-magnetic apparatus designed for use in normally-closed circuits—such, for instance, as telegraph-sounders, Morse registers, relays, and other instruments which are in active use at intervals and meanwhile lie idle with the battery-current traversing their coils. It is well known that as such instruments have heretofore been constructed with a single coil for each magnet-core and placed in normally-closed circuit, there is more electricity and battery material used when an instrument is doing no work than when it is in active operation. Take, for instance, the case of a telegraph-sounder placed according to the common practice in a normally-closed local circuit. A message received on the sounder and translated into Morse characters for the purpose of inspection, will show that while the instrument was in active operation receiving the message the local circuit was closed but little more than half the time, and consequently the quantity of battery material used up while the instrument was doing this work was nearly one-half less than is consumed during an equal period while it is idle. A similar condition exists in the employment of other electro-magnetic apparatus. It has seemed to me repugnant to the economical use of energy that more of it should be exerted to hold an apparatus out of use than is used to actuate it for accomplishing its functions; and the object of my invention is to reverse the heretofore-prevailing conditions of closed-circuit working of electro-magnets by providing an improved construction of apparatus whereby the least battery material is consumed while the least productive work is being done.

With this object in view, my invention consists in certain novel construction and combinations of devices, which will be hereinafter described, and illustrated in the accompanying drawings, in connection with a telegraph-sounder.

In the drawings, Figure 1 is a plan view of a telegraph-sounder provided with my improvement. Fig. 2 is a vertical section of the same on the line $x\ x$ of Fig. 1, and Fig. 3 is a vertical cross-section on the line $y\ y$ of Fig. 1. Fig. 4 is a diagram illustrating the principle of the apparatus.

The letter A indicates the electro-magnet; B, its armature; C, the armature-lever provided with front and back stops, as usual, and D is the retracting-spring for holding the armature against the back stop. The magnet and the supporting-posts E and bracket E′ stand upon metallic base F.

Upon each of the cores A′ of the magnet are arranged two coils, one (indicated by the letter $a$) being a coil of low resistance, arranged directly upon the core, while the other, $b$, is a coil of much higher resistance surrounding the coil $a$. The similar coils on the two cores are connected together in the usual manner, and both have one terminal connected to a binding-post, P, by wires $w$ and $w'$, respectively, the coils $b$ having their opposite terminal connected to a binding-post, P′, by a wire, $w^2$, and the coils $a$ have their opposite terminal connected by a wire, $w^3$, with a contact-post, Q, provided at its upper end with an adjustable contact-point, $q$, arranged in the path of a contact-spring, $c$, attached to the rear end of the armature-lever. The armature-lever must be electrically connected with post P′—as, for instance, through the supporting-standards E, metallic base F, and wire $w^4$. The terminal wire $w^2$ of the fine-wire coils may connect with the base F and have their connection with post P′ through the wire $w^4$. Supposing the sounder to be used with a local battery having a resistance of one unit, including the resistance of the conductor connecting it with the sounder, the coils $a$ of low resistance should have about the same resistance—namely, one unit. I prefer to make these coils of wire of such size that they will each occupy about half the space of the bobbin. The coils *b* have a resistance of about thirty times that of the coils *a*.

It will be seen from the drawings that when the armature is attracted by the magnet there is between the contact-spring *c* and contact-point *q* a break in the circuit through the coils *a* of low resistance; but these circuit closing and breaking devices do not affect the circuit through the coils of high resistance, except that by their action in closing circuit the current will be shunted or short-circuited from said coils of high resistance in a great measure—that is, the current will be divided between the two sets of coils in inverse proportion to their resistances. In other respects the coils of high resistance are worked precisely like the coils of an ordinary sounder.

The action and purpose of the circuit-breaking devices will be understood by considering the successive positions of the different parts of the apparatus while the sounder is operating in response to the makes and breaks of circuit during the transmission of a message.

As represented in the diagram Fig. 4, the sounder is supposed to be connected in a local-battery circuit by wires *l l*, and the local circuit closed by the usual relay, as shown at R. The current is now passing only through the coils *b* of high resistance, which sufficiently magnetize the cores to cause them to hold the armature-lever upon its front stop against the force of the retracting-spring; but these coils would not sufficiently magnetize said cores to cause them to attract the armature promptly if the lever were against its back stop. When the relay breaks the local circuit, the armature is drawn away from the magnet-poles by the retracting-spring, and the contact-spring *c* strikes the contact-point *q*, thus closing the break through the coils *a* of low resistance. No current passes until the relay closes the local circuit, at which time nearly the whole current from the battery passes through the said coils, but only for an instant, as the circuit through the coils of low resistance is again broken, when the cores under the vigorous action of these coils promptly attract the armature and cause the lever to strike its front stop while throwing the spring *c* up out of contact with the point *q*. The current now goes only through the coils of high resistance, which are sufficient to hold the armature down as before explained. These coils are of such great resistance that they greatly retard the consumption of material in the local battery, and a great saving is thus effected, as it will clearly be seen that the least amount of battery material is consumed while the sounder is idle or doing no effective work.

Besides the saving of battery material effected by my improvement the sounder can be worked more rapidly in consequence of the coils of low resistance being cut out before the armature reaches its position nearest the poles, as a great degree of demagnetization of the cores results from such cutting out, only such polarization remaining as is effected by the fine-wire coils. This slight polarization is quickly lost when the operator opens his key to commence his next signal, and in consequence of this the armature can be worked much nearer to the poles without danger of "sticking," and therefore be much sooner magnetized to the degree necessary to overcome the resistance of the retracting-spring. The extra current induced in the coils of high resistance at the time of breaking the circuit through the coils of low resistance being in the same direction as the primary current at the instant the armature reaches its nearest position to the poles, tends to bring the armature-lever promptly and firmly to its front stop.

While I have now described my invention in connection with a telegraph-sounder, it will be obvious that it may be applied to electric magnetic instruments designed for use on normally-closed circuit, and I therefore claim, broadly—

1. In an electro-magnetic apparatus, the combination, with an electro-magnet having one or more cores surrounded by two coils of different resistances, of automatic circuit-controlling devices for closing the circuit connection through the coil or coils of least resistance immediately following the breaking of the circuit including the coil or coils of higher resistance, whereby the closing of the circuit causes the current to pass through the coil of low resistance, and immediately open-circuit the same and leave the high-resistance coil or coils in circuit, substantially as set forth.

2. In an electro-magnetic apparatus for use on normally-closed circuit, an electro-magnet having separate energizing-coils of different resistances, in combination with an armature-lever and circuit closing and breaking devices operated thereby, the connections being essentially as shown, whereby, when a battery-circuit is closed through the coils of higher resistance, the armature-lever will be held toward the magnet-cores and the circuit through the coils of less resistance will be broken, and on the breaking of the circuit through the coils of higher resistance the armature-lever will be retracted by its spring and temporarily close the connection through the coil of less resistance, so that the armature will be again attracted when a battery-circuit is closed through said low-resistance coils.

3. In an electro-magnetic instrument, an electro-magnet provided with a retractile armature and having its cores wound with two coil-circuits of widely different resistances, in combination with an electric circuit adapted to be opened and closed, and automatic circuit closing and breaking devices arranged to break the coil-circuit of low resistance when the armature is attracted, substantially as described, and for the purpose set forth.

In testimony whereof I have signed this specification in the presence of two subscribing witnesses.

CHARLES CUMMINGS.

Witnesses:
C. S. MARTIN,
C. W. ROUNEL.